US009845732B2

United States Patent
Crothers et al.

(10) Patent No.: US 9,845,732 B2
(45) Date of Patent: Dec. 19, 2017

(54) SYSTEMS AND METHODS FOR VARIATION OF INJECTORS FOR COHERENCE REDUCTION IN COMBUSTION SYSTEM

(71) Applicant: General Electric Company, Schenectady, NY (US)

(72) Inventors: Sarah Lori Crothers, Greenville, SC (US); Joseph Vincent Citeno, Greenville, SC (US); Christian Xavier Stevenson, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 14/288,875

(22) Filed: May 28, 2014

(65) Prior Publication Data
US 2015/0345402 A1 Dec. 3, 2015

(51) Int. Cl.
*F23R 3/34* (2006.01)
*F02C 7/24* (2006.01)
(Continued)

(52) U.S. Cl.
CPC ............... *F02C 7/24* (2013.01); *F23N 1/022* (2013.01); *F23N 5/242* (2013.01); *F23R 3/28* (2013.01);
(Continued)

(58) Field of Classification Search
CPC .. F23R 3/34; F23R 3/346; F23R 2900/00013; F23R 2900/00014; F23R 3/28;
(Continued)

(56) References Cited

U.S. PATENT DOCUMENTS

| 2,072,826 A | 3/1937 | Riley |
| 4,044,553 A | 8/1977 | Vaught |

(Continued)

FOREIGN PATENT DOCUMENTS

| EP | 1605205 | 12/2005 |
| EP | 1632718 | 3/2006 |

(Continued)

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — Gerald L Sung
*Assistant Examiner* — Scott Walthour
(74) *Attorney, Agent, or Firm* — Charlotte C. Wilson; Ernest G. Cusick; Frank A. Landgraff (57) ABSTRACT

A system includes a gas turbine engine having a first combustor and a second combustor. The first combustor includes a first fuel conduit having a first plurality of injectors. The first plurality of injectors are disposed in a first configuration within the first combustor along a first fuel path, and the first plurality of injectors are configured to route a fuel to a first combustion chamber. The system further includes a second combustor having a second fuel conduit having a second plurality of injectors. The second plurality of injectors are disposed in a second configuration within the second combustor along a second fuel path, and the second plurality of injectors are configured to route the fuel to a second combustion chamber. The second configuration has at least one difference relative to the first configuration.

11 Claims, 4 Drawing Sheets

(51) Int. Cl.
- *F23R 3/28* (2006.01)
- *F23N 1/02* (2006.01)
- *F23N 5/24* (2006.01)
- *F01D 9/02* (2006.01)

(52) U.S. Cl.
CPC ............ *F23R 3/346* (2013.01); *F01D 9/023* (2013.01); *F05B 2260/96* (2013.01); *F05B 2260/966* (2013.01); *F05D 2260/96* (2013.01); *F23D 2210/00* (2013.01); *F23R 2900/00013* (2013.01); *F23R 2900/00014* (2013.01)

(58) Field of Classification Search
CPC ............ F05B 2260/96; F05B 2260/966; F23D 2210/00; F05D 2260/96
See application file for complete search history.

(56) References Cited

U.S. PATENT DOCUMENTS

| | | |
|---|---|---|
| 4,620,414 A | 11/1986 | Christ |
| 4,677,822 A | 7/1987 | Iizuka et al. |
| 4,724,670 A | 2/1988 | Greer |
| 4,901,694 A | 2/1990 | Sakita |
| 5,159,807 A | 11/1992 | Forestier |
| 5,211,004 A | 5/1993 | Black |
| 5,319,931 A | 6/1994 | Beebe et al. |
| 5,345,758 A | 9/1994 | Bussing |
| 5,575,144 A | 11/1996 | Brough et al. |
| 5,657,631 A | 8/1997 | Androsov |
| 5,809,769 A | 9/1998 | Richards et al. |
| 5,943,866 A | 8/1999 | Lovett et al. |
| 6,164,055 A | 12/2000 | Lovett et al. |
| 6,625,569 B2 | 9/2003 | James et al. |
| 6,820,431 B2 | 11/2004 | McManus et al. |
| 7,278,266 B2 | 10/2007 | Taware et al. |
| 7,320,222 B2 | 1/2008 | Flohr et al. |
| 7,331,182 B2 | 2/2008 | Graf et al. |
| 7,337,057 B2 | 2/2008 | Norman et al. |
| 7,451,601 B2 | 11/2008 | Taware et al. |
| 7,503,177 B2 | 3/2009 | Bland et al. |
| 7,523,614 B2 | 4/2009 | Tanimura et al. |
| 7,578,130 B1 | 8/2009 | Kraemer et al. |
| 7,620,461 B2 | 11/2009 | Frederick, II et al. |
| 7,693,147 B2 | 4/2010 | Williams et al. |
| 7,739,999 B2 | 6/2010 | Kang et al. |
| 7,743,599 B2 | 6/2010 | Taware et al. |
| 7,805,922 B2 | 10/2010 | Bland |
| 7,827,797 B2 * | 11/2010 | Han .................. F23R 3/286 431/114 |
| 7,886,545 B2 | 2/2011 | Lacy et al. |
| 7,908,072 B2 | 3/2011 | Tonno et al. |
| 7,997,083 B2 | 8/2011 | Meadows et al. |
| 8,112,216 B2 | 2/2012 | Davis, Jr. et al. |
| 8,113,000 B2 | 2/2012 | Laster et al. |
| 8,322,140 B2 | 12/2012 | Kim et al. |
| 8,966,909 B2 | 3/2015 | Crothers et al. |
| 9,027,349 B2 | 5/2015 | Miura et al. |
| 2003/0144787 A1 * | 7/2003 | Davis, Jr. .................. F02C 7/228 701/100 |
| 2004/0083738 A1 | 5/2004 | McManus et al. |
| 2005/0278108 A1 | 12/2005 | Norman et al. |
| 2006/0041368 A1 | 2/2006 | Williams et al. |
| 2006/0042261 A1 | 3/2006 | Taware et al. |
| 2006/0107666 A1 | 5/2006 | Kothnur |
| 2006/0254279 A1 | 11/2006 | Taware et al. |
| 2007/0180831 A1 | 8/2007 | Bland |
| 2007/0199328 A1 | 8/2007 | Shah et al. |
| 2008/0010966 A1 | 1/2008 | Taware et al. |
| 2008/0295521 A1 * | 12/2008 | Simons .................. F23R 3/286 60/805 |
| 2009/0005951 A1 | 1/2009 | Frederick et al. |
| 2009/0005952 A1 | 1/2009 | Tonno et al. |
| 2009/0063003 A1 | 3/2009 | Meadows et al. |
| 2009/0320483 A1 | 12/2009 | Storey et al. |
| 2010/0170254 A1 | 7/2010 | Venkataraman et al. |
| 2010/0192578 A1 | 8/2010 | Singh et al. |
| 2010/0232930 A1 | 9/2010 | Gregory |
| 2010/0236214 A1 | 9/2010 | Wiedenhoefer et al. |
| 2010/0313568 A1 | 12/2010 | Davis, Jr. et al. |
| 2011/0048021 A1 | 3/2011 | Slobodyanskiy et al. |
| 2011/0072826 A1 | 3/2011 | Narra et al. |
| 2011/0162370 A1 | 7/2011 | Kim et al. |
| 2011/0179795 A1 | 7/2011 | Johnson et al. |
| 2011/0308654 A1 | 12/2011 | Bothien et al. |
| 2012/0006029 A1 | 1/2012 | Bilbao et al. |
| 2012/0131923 A1 | 5/2012 | ElKady et al. |
| 2012/0144832 A1 | 6/2012 | Herbon et al. |
| 2013/0000312 A1 | 1/2013 | Kodukulla et al. |
| 2013/0014514 A1 | 1/2013 | Romig et al. |
| 2014/0053528 A1 | 2/2014 | Crothers et al. |
| 2014/0060063 A1 | 3/2014 | Boardman et al. |
| 2014/0109587 A1 | 4/2014 | Crothers et al. |
| 2014/0137561 A1 | 5/2014 | Crothers et al. |
| 2014/0238026 A1 | 8/2014 | Boardman et al. |
| 2014/0238033 A1 | 8/2014 | Crothers et al. |
| 2014/0238041 A1 | 8/2014 | Crothers et al. |
| 2014/0260299 A1 | 9/2014 | Boardman et al. |
| 2014/0338341 A1 | 11/2014 | Abreu |
| 2015/0219337 A1 | 8/2015 | Crothers et al. |
| 2015/0260407 A1 | 9/2015 | Crothers et al. |
| 2015/0285508 A1 | 10/2015 | Olson |

FOREIGN PATENT DOCUMENTS

| | | |
|---|---|---|
| EP | 2031192 | 3/2009 |
| JP | 2009281720 A | 12/2009 |
| JP | 2012102733 A | 5/2012 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/288,974, filed May 28, 2014, Crothers et al.
U.S. Appl. No. 14/316,616, filed Jun. 26, 2014, Crothers et al.
U.S. Appl. No. 14/659,399, filed Mar. 16, 2015, DiCintio et al.
U.S. Appl. No. 14/171,001, filed Feb. 3, 2014, Crothers et al.
U.S. Appl. No. 14/192,687, filed Feb. 27, 2014, Crothers et al.
U.S. Appl. No. 14/207,041, filed Mar. 12, 2014, Crothers et al.
U.S. Appl. No. 14/276,700, filed May 13, 2014, Crothers et al.
U.S. Appl. No. 14/249,158, filed Apr. 9, 2014, Ziminsky et al.
U.S. Appl. No. 14/248,194, filed Apr. 8, 2014, Stevenson et al.
U.S. Appl. No. 14/048,252, filed Oct. 8, 2013, Crothers et al.
U.S. Appl. No. 14/170,702, filed Feb. 3, 2014, Day et al.
U.S. Appl. No. 14/170,710, filed Feb. 3, 2014, Carrell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.

* cited by examiner

SYSTEMS AND METHODS FOR VARIATION OF INJECTORS FOR COHERENCE REDUCTION IN COMBUSTION SYSTEM

BACKGROUND

The subject matter disclosed herein relates generally to gas turbine systems, and more particularly, to systems and methods for reducing combustion dynamics, and more specifically, for reducing modal coupling of combustion dynamics within a gas turbine engine.

Gas turbine systems generally include a gas turbine engine having a compressor section, a combustor section, and a turbine section. The combustor section may include one or more combustors (e.g., combustion cans), each combustor having a primary combustion zone and a secondary combustion zone (e.g., late lean injection (LLI) system) downstream from the primary combustion zone. A fuel and/or fuel-air (e.g., oxidant) mixture may be routed into the primary and secondary combustion zones through fuel nozzles, and each combustion zone may be configured to combust the mixture of the fuel and oxidant to generate hot combustion gases that drive one or more turbine stages in the turbine section.

The generation of the hot combustion gases can create combustion dynamics, which occur when the flame dynamics (also known as the oscillating component of the heat release) interact with, or excite, one or more acoustic modes of the combustor, to result in pressure oscillations in the combustor. Combustion dynamics can occur at multiple discrete frequencies or across a range of frequencies, and can travel both upstream and downstream relative to the respective combustor. For example, the pressure waves may travel downstream into the turbine section, e.g., through one or more turbine stages, or upstream into the fuel system. Certain downstream components of the turbine section can potentially respond to the combustion dynamics, particularly if the combustion dynamics generated by the individual combustors exhibit an in-phase and coherent relationship with each other, and have frequencies at or near the natural or resonant frequencies of the components. In general, "coherence" refers to the strength of the linear relationship between two dynamic signals, and is strongly influenced by the degree of frequency overlap between them. In certain embodiments, "coherence" can be used as a measure of the modal coupling, or combustor-to-combustor acoustic interaction, exhibited by the combustion system.

Accordingly, a need exists to control the combustion dynamics, and/or modal coupling of the combustion dynamics, to reduce the possibility of any unwanted sympathetic vibratory response (e.g., resonant behavior) of components in the turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine having a first combustor and a second combustor. The first combustor includes a first fuel conduit having a first plurality of injectors. The first plurality of injectors are disposed in a first configuration within the first combustor along a first fuel path, and the first plurality of injectors are configured to route a fuel to a first combustion chamber. The system further includes a second combustor which includes a second fuel conduit having a second plurality of injectors. The second plurality of injectors are disposed in a second configuration within the second combustor along a second fuel path, and the second plurality of injectors are configured to route the fuel to a second combustion chamber. The second configuration has at least one difference relative to the first configuration.

In a second embodiment, a system includes a second combustor having a second fuel conduit, which includes a second plurality of fuel injectors with a second arrangement. The second plurality of fuel injectors are configured to route the fuel to a second secondary combustion zone of the second combustor. The second plurality of fuel injectors comprises a third injector having at least one difference relative to a fourth injector.

In a third embodiment, a method includes controlling a first combustion dynamic of a first combustor or a first flame dynamic of a first set of fuel injectors of the first combustor with a first arrangement of the first set of fuel injectors. The method further includes controlling a second combustion dynamic of a second combustor or a second flame dynamic of a second set of fuel injectors of the second combustor with a second arrangement of the second set of fuel injectors. The first arrangement comprises at least one difference relative to the second arrangement.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed towards reducing combustion dynamics and/or modal coupling of combustion dynamics, to reduce unwanted vibratory responses in downstream components. As described above, a combustor within the gas turbine system combusts an oxidant-fuel mixture to generate hot combustion gases that drive one or more turbine stages in the gas turbine. In some situations, the combustion system may create combustion dynamics due to the combustion process, characteristics of intake fluid flows (e.g., fuel, oxidant, diluent, etc.) into the combustor, and various other factors. The combustion dynamics may be characterized as pressure fluctuations, pulsations, oscillations, and/or waves at certain frequencies. Collectively, the combustion dynamics can potentially cause vibratory responses and/or resonant behavior in various components upstream and/or downstream from the combustor. For example, the combustion dynamics (e.g., at certain frequencies, ranges of frequencies, amplitudes, combustor-to-combustor phases, etc.) can travel both upstream and downstream in the gas turbine system. If the gas turbine combustors, upstream components, and/or downstream components have natural or resonant frequencies that are driven by these pressure fluctuations (i.e. combustion dynamics), then the pressure fluctuations can potentially cause vibration, stress, fatigue, etc. The components may include combustor liners, combustor flow sleeves, combustor caps, fuel nozzles, turbine nozzles, turbine blades, turbine shrouds, turbine wheels, bearings, fuel supply assemblies, or any combination thereof. The downstream components are of specific interest, as they are more sensitive to combustion tones that are in-phase and coherent. Thus, reducing coherence specifically reduces the possibility of unwanted vibrations in downstream components.

As discussed in detail below, the disclosed embodiments may vary the position and/or location of one or more injectors (e.g., late lean injectors) within a fuel supply assembly (e.g., late lean injection (LLI) fuel circuit) within, between, and/or among one or more combustors of the gas turbine system. More specifically, the disclosed embodiments may vary the position of the late lean injectors via axial staggering and/or circumferential grouping to modify the fuel-air ratio of each injector, or a group of injectors, and/or the distribution of the heat release, modifying the flame dynamics, and therefore the combustion dynamics of the gas turbine combustor (e.g., varying the frequency, amplitude, range of frequencies, or any combination thereof). In addition, modifying the arrangement of late lean injectors may also alter the geometries of the fuel volumes, and therefore, may alter the acoustic response of the fuel system. Referred to in the art as fuel system impedance, modifying the acoustic response of the late lean injector fuel system can affect the interaction between the flame dynamics and the acoustic response of the combustor, which can, in turn, alter the combustion dynamics amplitude and/or frequency, coherence, range of frequencies, or any combination thereof). As noted above, a gas turbine system may include one or more combustors (e.g., combustor cans, combustors, etc.), and each combustor may be configured with a primary combustion zone and a secondary combustion zone. Specifically, in some embodiments, the secondary combustion zone may include an LLI fuel circuit configured to route a secondary fuel into a secondary combustion zone for combustion. In certain embodiments, each LLI fuel circuit includes one or more fuel lines configured to provide the secondary fuel to one or more fuel injectors (e.g., LLI injectors) that route the secondary fuel into the secondary combustion zone. In particular, the position of each LLI injector among the plurality of LLI injectors within a combustor may be varied relative to the other LLI injectors within the same combustor, between LLI injectors of an adjacent combustor, and/or among the LLI injectors of any of the plurality of combustors within the gas turbine system. In some embodiments, the LLI injectors may be varied via axial staggering such that the LLI injectors are shifted along an axial axis within the combustor and/or between combustors. In some embodiments, the LLI injectors may be varied via circumferential grouping such that the LLI injectors are distributed or grouped differently on a plane in the circumferential direction within the combustor and/or between combustors.

In certain embodiments, varying the arrangement, configuration, and/or function of the LLI injectors of the gas turbine system may change the heat release energy distribution and/or flame shape, thereby driving different flame dynamic behavior in each combustor and shifting the combustion dynamics frequency between the combustors of the system. Since coherence may be indicative of the similarity of the combustion dynamics frequency between the combustors, shifting the combustion dynamics frequency between the combustors of the system may decrease coherence between combustors. In certain implementations, the combustor tone may be smeared or spread out over a greater frequency range, reducing combustion dynamics amplitude and potentially reducing coherence. Particularly, varying the arrangement of LLI injectors of a particular combustor relative to the LLI injectors of another combustor within the system may vary both the heat release distribution, as well as, that particular combustor's fuel side impedance relative to other combustors, thereby changing the coupling between the acoustic and heat release perturbations, driving a flame dynamic behavior that is different than the flame dynamic behavior of one or more of the other combustors of the system. Accordingly, the resulting combustion dynamics frequencies between the combustors are different, thereby reducing coherence and therefore, modal coupling of the combustors.

Figure 1:
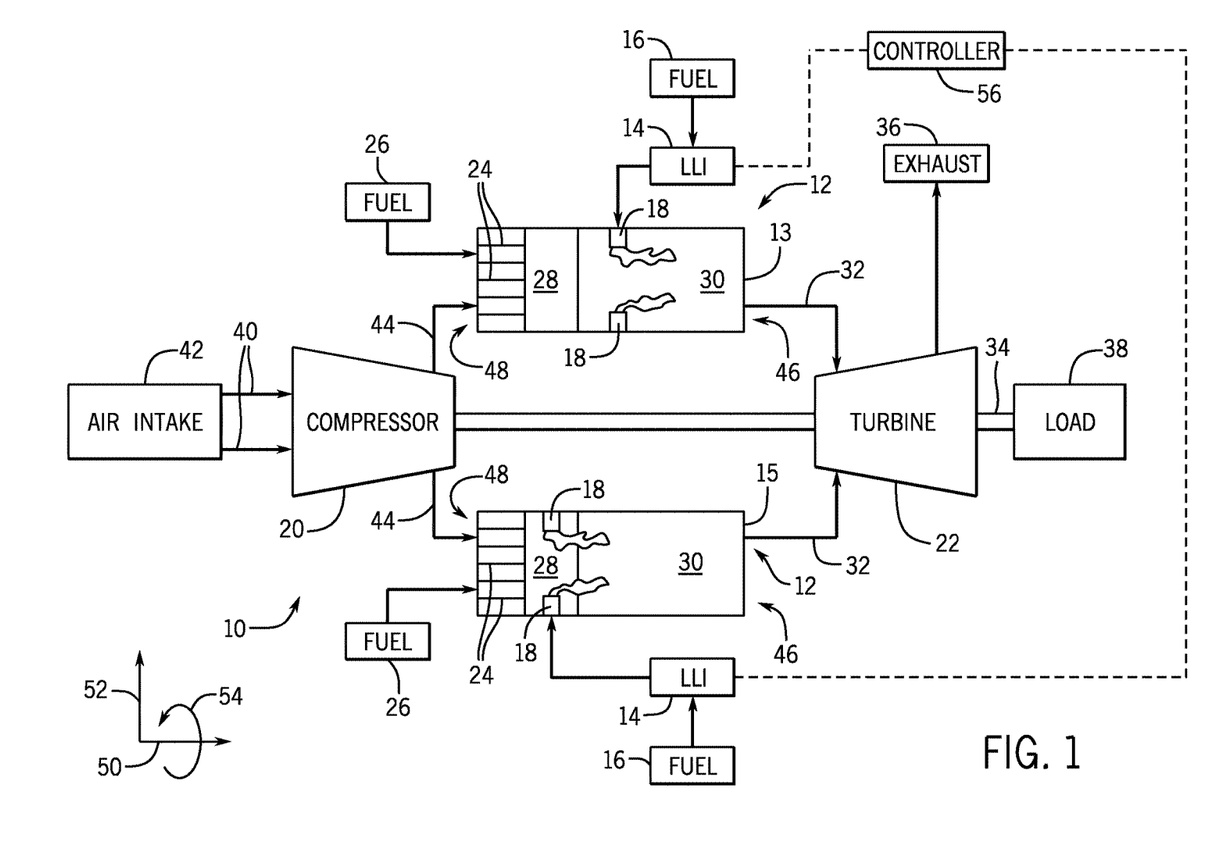
FIG. 1 is a schematic of an embodiment of a gas turbine system having a plurality of combustors, where each combustor of the plurality of combustors is equipped with a late lean injection (LLI) fuel circuit having a plurality of LLI injectors in a LLI injector arrangement.

With the forgoing in mind, FIG. 1 is a schematic of an embodiment of a gas turbine system 10 having a plurality of combustors 12, wherein each combustor 12 is equipped with a secondary fuel circuit, such as a LLI fuel circuit 14. In certain embodiments, one or more of the combustors 12 of the system 10 may not be equipped with a secondary fuel circuit. The LLI fuel circuit 14 may be configured to route a secondary fuel 16, such as a liquid and/or gas fuel into the combustors 12. For example, the secondary fuel 16 may be routed to one or more secondary fuel injectors of the combustor 12, such as the LLI fuel injectors 18. In particular, the arrangement of the LLI fuel injectors 18 for one or more combustors 12 may be varied relative to the LLI fuel injectors 18 of other combustors 12 within the system 10. As noted above and as further described in detail below, varying the arrangement and/or configuration of the LLI injectors 18 within the system 10 may change the heat release energy distribution and/or flame shape between the combustors 12, thereby driving different flame dynamic behavior in each combustor 12 and shifting the combustion dynamics frequency between the combustors 12 of the system 10. Accordingly, the resulting combustion dynamics frequencies between the combustors 12 are different, thereby reducing coherence and therefore, modal coupling of the combustors 12.

The gas turbine system 10 includes one or more combustors 12 having the plurality of injectors 18 (e.g., 1, 2, 3, 4, 5, 6, 7, 8, 9, 10 or more injectors 18), a compressor 20, and a turbine 22. The combustors 12 include primary fuel nozzles 24 which route a primary fuel 26, such as a liquid fuel and/or a gas fuel into the combustors 12 for combustion within a primary combustion zone 28. Likewise, the combustors 12 include the LLI injectors 18 which route the secondary fuel 16 into the combustors 12 for combustion within a secondary combustion zone 30. The combustors 12 ignite and combust an oxidant-fuel mixture, and then hot combustion gases 32 are passed into the turbine 22. The turbine 22 includes turbine blades that are coupled to a shaft 34, which is also coupled to several other components throughout the system 10. As the combustion gases 32 pass through the turbine blades in the turbine 22, the turbine 22 is driven into rotation, which causes the shaft 34 to rotate. Eventually, the combustion gases 32 exit the turbine system 10 via an exhaust outlet 36. Further, the shaft 34 may be coupled to a load 38, which is powered via rotation of the shaft 34. For example, the load 38 may be any suitable device that may generate power via the rotational output of the turbine system 10, such as an external mechanical load. For instance, the load 38 may include an electrical generator, the propeller of an airplane, and so forth.

In an embodiment of the turbine system 10, compressor blades are included as components of the compressor 20. The blades within the compressor 20 are coupled to the shaft 34, and will rotate as the shaft 34 is driven to rotate by the turbine 22, as described above. The rotation of the blades within the compressor 20 compress air (or any suitable oxidant) 40 from an air inlet 42 into pressurized air 44 (e.g., pressurized oxidant). The pressurized oxidant 44 is then fed into the primary fuel nozzles 24 and the secondary fuel nozzles (i.e. late lean injectors 18) of the combustors 12. The primary fuel nozzles 24 and the secondary fuel nozzles (i.e. late lean injectors 18) mix the pressurized oxidant 44 and fuel (e.g., the primary fuel 26) to produce a suitable mixture ratio for combustion (e.g., a combustion that causes the fuel to more completely burn) so as not to waste fuel or cause excess emissions.

In some embodiments, the physical location of one or more LLI injectors 18 may vary relative to LLI injectors 18 within and/or between combustors 12. For example, the position and/or arrangement of the LLI injectors 18 of a first combustor 13 may be different than the position and/or arrangement of the LLI injectors 18 of another combustor 12, such as an adjacent (or non-adjacent) second combustor 15. In the illustrated embodiment, the LLI injectors 18 of the first combustor 13 are disposed closer to the exit of the combustor 46 (and further from a head end 48) compared to the LLI injectors 18 of the second combustor 15. In other words, the LLI injectors 18 of the combustor 12 may be shifted along an axial direction or axis 50 (e.g., a longitudinal axis), such that the position of the LLI injectors 18 may vary between the combustors 12. It should be noted that in other embodiments, the position of the LLI injectors 18 may be varied along a circumferential direction or axis 54. As noted above, varying the arrangement of the LLI injectors 18 of one combustor 12 relative to another may change the heat release energy distribution and/or flame shape at each LLI injector 18, thereby driving different flame dynamic behaviors and shifting the frequency response between the combustors 12.

In some embodiments, the system 10 may include a controller 56 configured to regulate the one or more LLI circuits 14, where each LLI circuit 14 is associated with the combustor 12. The controller 56 (e.g., industrial controller, or any suitable computing device, such as desktop computer, tablet, smart phone, etc.) may include a processor and a memory (e.g., non-transitory machine readable media) suitable for executing and storing computer instruction and/or control logic. For example, the processor may include general-purpose or application-specific microprocessors. Likewise, the memory may include volatile and/or non-volatile memory, random access memory (RAM), read only memory (ROM), flash memory, hard disk drives (HDD), removable disk drives and/or removable disks (e.g., CDs, DVDs, Blu-ray Discs, USB pen drives, etc.), or any combination thereof.

In certain embodiments, the controller 56 may be useful in regulating the secondary fuel 16 routed to one or more LLI injectors 18 via the one or more LLI fuel circuits 14. For example, in some embodiments, the controller 56 may be configured to bias the secondary fuel 16 routed through the LLI fuel circuit 14 to the LLI injectors 18 of a particular combustor 12. For example, for a particular combustor 12, the controller 56 may route more secondary fuel 16 to certain LLI injectors 18 than others. Indeed, in certain embodiments, the controller 56 may be configured to bias the secondary fuel 16 such that one or more LLI injectors 18 of a particular combustor 12 receive the secondary fuel 16 while the remaining LLI injectors 18 of the combustor 12 do not. The LLI fuel circuit 14 may include one or more circuits supplying one or more cans, or valves, to facilitate injector-level fuel flow control.

In addition, in some embodiments, the controller 56 may be configured to bias the secondary fuel 16 routed to one or more LLI injectors 18 of different combustors 12 of the system 10. For example, the controller 56 may route more secondary fuel 16 to one or more LLI injectors 18 of the first combustor 13 than one or more LLI injectors 18 of the second combustor 15. In such embodiments, the position and/or configuration of the LLI injectors 18 of the first combustor 13 and the second combustor 15 may be approximately the same, but the LLI injectors 18 may have a different operation based in part on how the controller 56 is configured to regulate the LLI circuits 14 and/or the secondary fuel 16 associated with each combustor 12. In this manner, the controller 56 may be configured to change the operation of the LLI injectors 18 to reduce combustion dynamics without necessarily varying the arrangement and/or configuration of the injectors 18. For example, the controller 56 may be configured to vary the function of the LLI injectors 18 in a manner that changes the heat release energy distribution and/or flame shape of the injectors 18 between the combustors 12, such that different flame dynamic behavior is driven and the resulting combustion dynamics frequencies are shifted.

Figure 2:
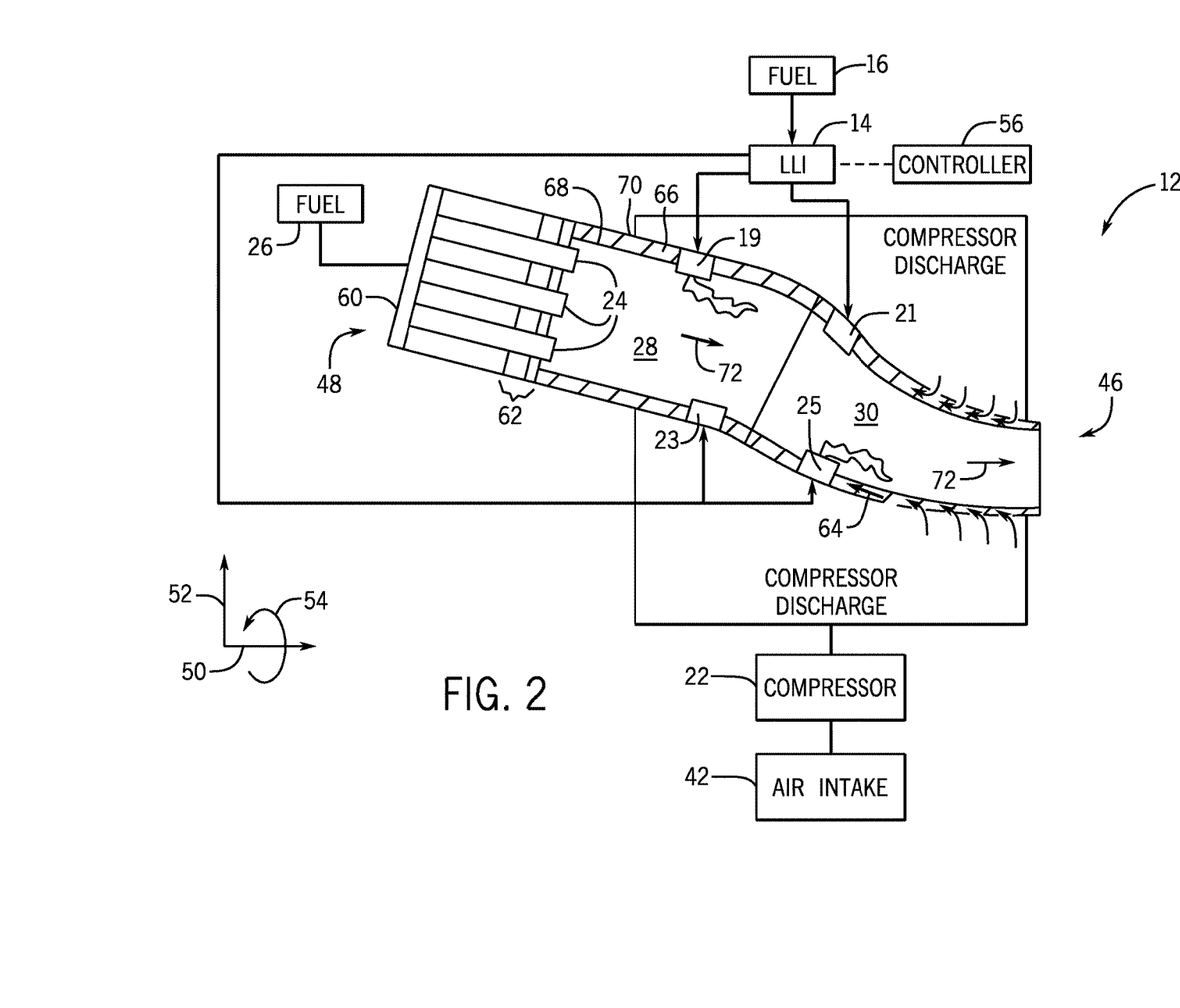
FIG. 2 is a cross-sectional schematic of an embodiment of one of the combustors of FIG. 1, where the combustor is operably coupled to the LLI fuel circuit and a controller.

FIG. 2 is a schematic of an embodiment of one of the combustors 12 of FIG. 1, where the combustor 12 is operatively coupled to the LLI fuel circuit 14 and the controller 56. As noted above, the LLI fuel circuit 14 may be configured to route the secondary fuel 16 to the one or more LLI injectors 18 of the combustor 12. Further, the controller 56 may be configured to regulate the LLI fuel circuit 14 and/or the secondary fuel 16 routed to the one or more LLI injectors 18. In certain embodiments, the position and/or configuration of the LLI injectors 18 may be varied relative to the LLI injectors 18 of other combustors 12 within the system 10. Further, in some embodiments, such as in the illustrated embodiment, the controller 56 may be configured to control the operation of one or more LLI injectors 18 of a particular combustor 12, such that the LLI injectors 18 of the combustor 12 have different heat release energy distributions and/or flame shapes, such that different flame dynamic behaviors are driven and the resulting combustion dynamics frequencies are shifted. In this manner, the combustor 12 may be regulated to have reduced coherence behavior (as described in detail below), and therefore may reduce the possibility of modal coupling between and/or among the combustors 12 within the system 12 (as described in detail with respect to FIG. 3).

The combustor 12 includes the head end 48 having an end cover 60, a combustor cap assembly 62, the primary combustion zone 28, and the secondary combustion zone 30. The end cover 60 and the combustor cap assembly 62 may be configured to support the primary fuel nozzles 24 in the head end 48. In the illustrated embodiment, the primary fuel nozzles 24 route the primary fuel 26 to the primary combustion zone 28. Further, the primary fuel nozzles 24 receive the pressurized oxidant (e.g., pressurized air) 44 from the annulus 66 (e.g., between liner 68 and flow sleeve 70) of the combustor 12 and combine the pressurized oxidant 44 with the primary fuel 26 to form an oxidant/fuel mixture that is ignited and combusted in the primary combustion zone 28 to form combustion gases (e.g., exhaust). The combustion gases flow in a direction 72 to the secondary combustion zone 30. The LLI fuel circuit 14 provides the secondary fuel 16 to the one or more LLI injectors 18, which may be configured to route the secondary fuel 16 to the secondary combustion zone 30. In particular, the LLI injectors 18 receive and route the secondary fuel 16 into the stream of combustion gases in the secondary combustion zone 30, flowing in the downstream direction 72. Further, the LLI injectors 18 may receive the pressurized oxidant 44 from the annulus 66 of the combustor 12 and/or directly from the compressor discharge, and combine the pressurized oxidant 44 with the secondary fuel 16 to form an oxidant/fuel mixture that is ignited and combusted in the secondary combustion zone 30 to form additional combustion gases. More specifically, the pressurized oxidant 44 flows through the annulus 66 between the liner 68 and the flow sleeve 70 of the combustor 12 to reach the head end 48. The combustion gases flow in the direction 72 towards the exit 46 of the combustor 12, and pass into the turbine 22, as noted above.

As described above, combustion dynamics (e.g., generation of hot combustion gases) within the primary combustion zone 28 and/or the secondary combustion zone 30 may lead to unwanted vibratory responses in downstream components. Accordingly, it may be beneficial to control the combustion dynamics, and/or the modal coupling of the combustion dynamics between various combustors 12 of the system 10, to help reduce the possibility of any unwanted sympathetic vibratory responses (e.g., resonant behavior) of components within the system 10. In certain embodiments, the controller 56 may be configured to regulate the LLI fuel circuit 14 and control the secondary fuel 16 routed to one or more LLI injectors 18 of the combustor 12. For example, in the illustrated embodiment, the controller 56 may be configured to bias the amount of secondary fuel 16 routed to a first injector 19, a second injector 21, a third injector 23, and a fourth injector 25. In particular, the controller 56 may be configured to regulate the LLI circuit 14 in order to bias the secondary fuel 16 such that the first injector 19 and the third injector 23 receive more secondary fuel 16 than the second injector 21 and the fourth injector 25. Accordingly, the heat release energy distribution and/or the flame shape of the first and third injectors 19, 23 may be different than the heat release energy distribution and/or the flame shape of the second and fourth injectors 21, 25. Further, the flame shape of the first and third injectors 19, 23 may be different than the flame shape of the second and fourth injectors 21, 25. In some situations, the controller 56 may be configured to bias all (or almost all) of the secondary fuel 16 away from one or more injectors 18, such that one or more injectors 18 contribute minimally to the combustion gases generated in the secondary combustion zone 30. In some situations, the controller 56 may be configured to bias some of the secondary fuel 16 away from one or more injectors 18 of the combustor, such that the injectors 18 contribute in various amounts to the combustion gases generated in the secondary combustion zone 30.

In some embodiments, the controller 56 may be configured to vary the arrangement of the functioning LLI injectors 18 by controlling the LLI fuel circuit 14 and regulating the amount of secondary fuel 16 routed to each injector 18 of the combustor 12. In certain embodiments, the controller 56 may bias the secondary fuel 16 to the first and second injectors 19, 21 in the first combustor 13, and may bias the secondary fuel 16 to the third and fourth injectors 23, 25 in the second combustor 15, as further described with respect to FIG. 3. In this manner, the controller 16 may be configured to regulate and/or vary the heat release energy distribution and/or the flame shape of the injectors 18 within one or more combustors 12, thereby driving different flame dynamic behaviors within and between combustors 12 of the system 10. In this manner, the combustion dynamics frequency within and/or between combustors 12 may be shifted, such that there is decreased coherence between the combustors 12.

Figure 3:
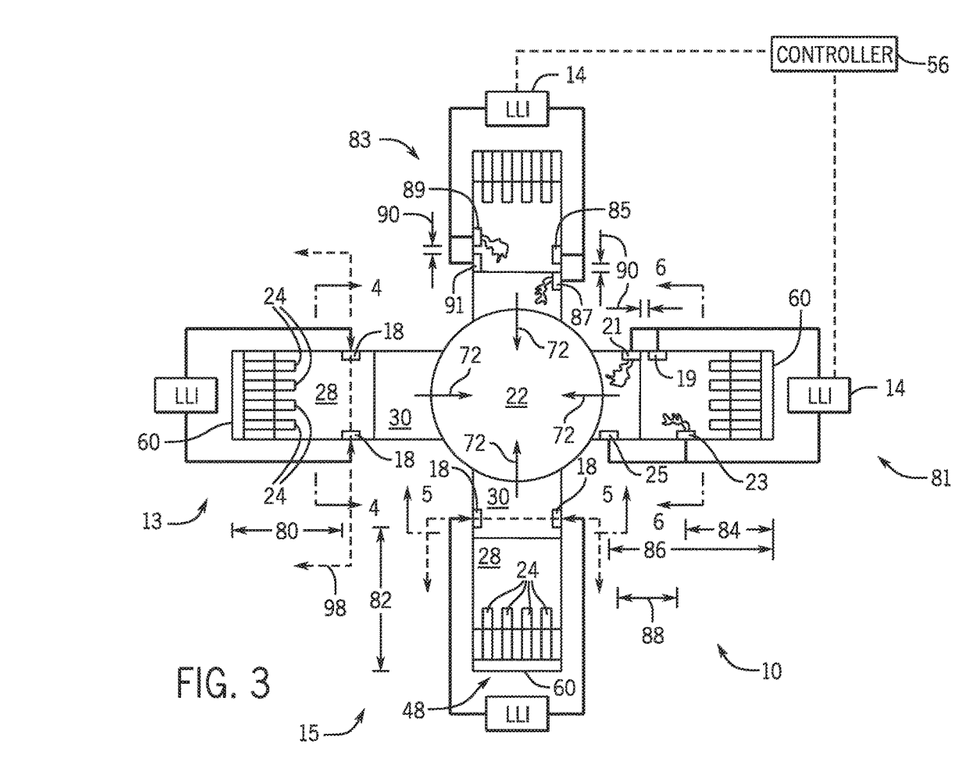
FIG. 3 is a schematic of an embodiment of the gas turbine system of FIG. 1, illustrating a plurality of combustors each having a plurality of late lean injectors, where the arrangement of the late lean injectors in each of the plurality of combustors varies between combustors to control combustion dynamics and therefore modal coupling of combustion dynamics, thereby reducing the possibility of unwanted vibratory responses in downstream components.

FIG. 3 is a schematic of an embodiment of the gas turbine system 10 of FIG. 1, illustrating a plurality of combustors 12 each equipped with the LLI fuel circuit 14 having a plurality of LLI injectors 18 (e.g., 1, 2, 3, 4, 5, 6, 7, 8, 9, 10 or more injectors 18). In the illustrated embodiment, the gas turbine system 10 includes four combustors 12 coupled to the turbine 22. In some embodiments, the system 10 may include any number of combustors 12, such as 1, 2, 3, 4, 5, 6, 7, 8, 9, 10, or more combustors 12 coupled to the turbine 22. In addition, one or more of the LLI fuel circuits 14 associated with the combustors 12 may be operatively coupled to the controller 56. In particular, in certain embodiments, the one or more LLI injectors 18 of each combustor 12 may have a particular arrangement (e.g., configuration, position, etc.) and/or may be controlled by the controller 56 to have a particular operation configured to help reduce coherent behavior within the system 10, as further described in detail below. More specifically, the arrangement and/or the operation of the LLI injectors 18 may vary within and/or between the combustors 12 of the system, such that the LLI injectors 18 are driven at different flame dynamic behaviors and have varied fuel system impedances, thereby generating combustion dynamics frequencies that are shifted between the combustors 12 of the system 10. Since coherence may be indicative of the similarity of the combustion dynamics frequencies between the combustors, shifting the combustion dynamics frequencies between the combustors of the system may reduce coherence between combustors 12.

In certain embodiments, the position of one or more LLI injectors 18 may be shifted along the axial direction or axis 50 of the system, such that the position of the LLI injectors 18 vary between the combustors 12. For example, the LLI injectors 18 of the first combustor 13 may be disposed approximately a first distance 80 from the endcover 60 of the first combustor 13. In addition, the LLI injectors 18 of the second combustor 15 may be disposed approximately a second distance 82 from the endcover 60 of the second combustor 15, where the second distance 82 may be greater than the first distance 80. It should be noted that in some embodiments, the second distance 82 may be less than and/or approximately the same as the first distance 80, such that the LLI injectors 18 of the second combustor 15 are closer to the head end 48 than the LLI injectors 18 of the first combustor 13, or such that the LLI injectors 18 of the first and second combustors 13, 15 are approximately the same.

In some embodiments, the position of one or more LLI injectors 18 may be shifted along the axial direction or axis 50, such that the position of the LLI injectors 18 vary within, as well as between the combustors 12. For example, each LLI injector 18 of a third combustor 81 may be disposed at a different distance from the endcover 60 of the third combustor 81. In addition, each LLI injector 18 of a fourth combustor 83 may be disposed at approximately a different distance from the endcover 60 of the fourth combustor 83. For example, in the third combustor 81, a third distance 84 from the endcover 60 to the third injector 23 may be less than a fourth distance 86 from the endcover 60 to the fourth injector 25. It should be noted that in some embodiments, the third distance 84 may be greater than the fourth distance 86.

In some embodiments, the distance between various pairs of injectors 18 of a particular combustor may vary within that particular combustor. For example, a fifth distance 88 between the third and fourth injectors 23, 25 may be greater than a sixth distance 90 between the first and second injectors 19, 21 of the third combustor 81. In this manner, the injectors 18 of the third combustor 81 may be axially staggered along the axial direction 50 within the combustor 81. It should be noted that the distance between the injectors 18 (e.g., the fifth or sixth distances 88 and 90) may be any distance. Further, in some embodiments, the injectors 18 of the third combustor 81 may be axially staggered relative to the injectors 18 of the fourth combustor 83. For example, the fifth distance 88 between the third and fourth injectors 23, 25 may be greater than the sixth distance 90 between a fifth and a sixth injector 85, 87, respectively. In this manner, varying the position of the injectors 18 via axial staggering along the axial direction 50 between and/or within the combustors 12 (e.g., the first and second combustors 13, 15 and/or the third and fourth combustors 81, 83, etc.) may vary the heat release energy distribution and/or flame shape, thereby driving different flame dynamic behaviors between combustors 12. Accordingly, different flame dynamic behavior is driven and the resulting combustion dynamics frequencies are shifted between the combustors 12.

In certain embodiments, the controller 56 may be operatively coupled to one or more LLI circuits 14 associated with one or more combustors 12. In particular, the controller 56 may be configured to control a particular LLI circuit 14 by regulating the amount of secondary fuel 16 routed and/or biased to the one or more injectors 18 of the combustor 12 associated with that particular LLI circuit 14. For example, in the illustrated embodiment, the controller 56 may be operatively coupled to a third LLI fuel circuit 14 associated with the third combustor 81 and a fourth LLI fuel circuit 14 associated with the fourth combustors 83. In some situations, the controller 56 may be configured to bias the secondary fuel 16 routed to the injectors 18 of the third and fourth combustor 81, 83 according to a particular arrangement, such that only the injectors 18 in specific positions are fueled. For example, the controller 56 may be configured to route secondary fuel 16 to the second injector 21, the third injector 23, the sixth injector 87, and a seventh injector 89 and away from the first injector 19, the fourth injector 25, the fifth injector 85, and an eighth injector 91. Accordingly, as illustrated, the heat release distribution and/or the flame shape of the injectors 18 biased with more secondary fuel 16 may be different than the injectors 18 biased with less secondary fuel 16, thereby driving different flame dynamic behaviors between combustors 12. As such, different flame dynamic behavior is driven and the resulting combustion dynamics frequencies are shifted between the third and fourth combustors 81, 83.

In some embodiments, the system 10 may include one or more groups (e.g., 1, 2, 3, 4, 5, or more) of combustors 12, where each group of combustors 12 includes one or more combustors 12 (e.g., 1, 2, 3, 4, 5, or more). In some situations, each group of combustors 12 may include identical combustors 12 that differ from one or more other groups of combustors 12 within the system 10. For example, a first group of combustors 12 may include identical combustors 12 having a particular arrangement of LLI injectors 18, and a second group of combustors 12 may include identical combustors 12 having a second arrangement of LLI injectors 18. Further, the first and second arrangements of LLI injectors 18 may be different in one or more ways, as described above. Accordingly, the first group of combustors 12 may produce a flame dynamic behavior and a fuel system impedance that is different from the flame dynamic behavior and the fuel system impedance of the second group of combustors 12 within the system 10, thereby generating combustion dynamics frequencies that are shifted between the combustors 12 of the system 10.

For example, in certain embodiments, a first group of combustors 12 may include identical combustors 12 each having a first arrangement of LLI injectors 18, a second group of combustors 12 may include identical combustors 12 each having a second arrangement of LLI injectors 18, and a third group of combustors 12 may include identical combustors 12 each having a third arrangement of LLI injectors 18. Further, the arrangements of the LLI injectors 18 of each group of combustors 12 may be different from each other in one or more ways, as described with respect to FIGS. 3-6. Accordingly, the LLI injectors 18 of the first group of combustors 12 may be arranged to achieve a first flame dynamic behavior or fuel system impedance, the LLI injectors 18 of the second group of the combustors 12 may be arranged in a configuration different from the baseline configuration to achieve a second flame dynamic behavior or fuel system impedance, and the LLI injectors 18 of the third group of the combustors 12 may be arranged in a configuration different form the baseline configuration to achieve a third flame dynamic behavior or fuel system impedance. The first, second, and third flame dynamic behavior or fuel system impedance may be different from one another. As a result, the combustion dynamics frequencies are shifted between the different groups of combustors 12 of the system 10. In certain embodiments, the controller 56 may be configured to control the configuration of the LLI injectors 18 within each group of combustors 12, as further described above. Though three groups and three frequencies are described, it should be clear that any number of groups and/or frequencies may be employed.

Figures 4, 5, 6:
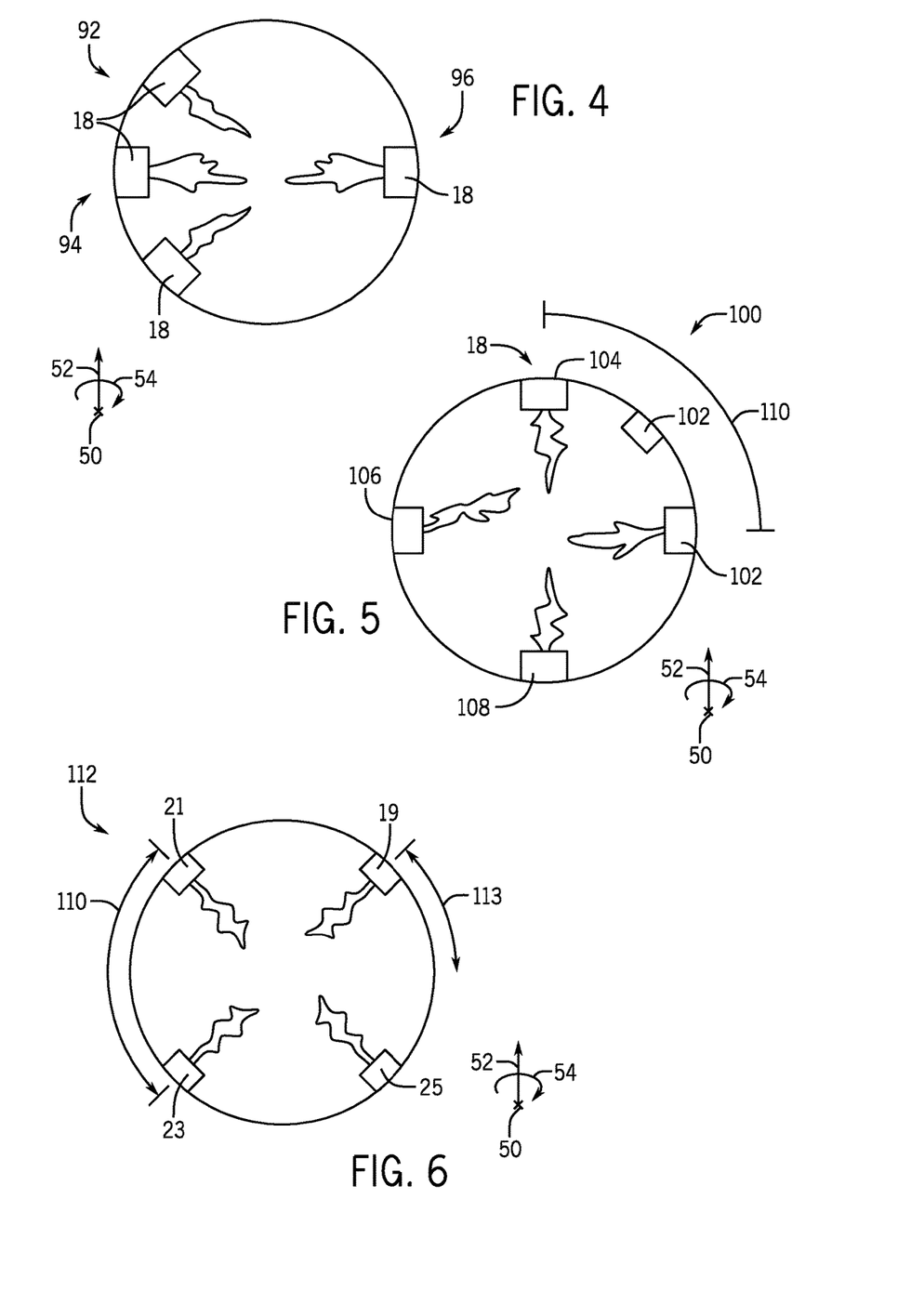
FIG. 4 is a cross-sectional schematic of an embodiment of a first combustor in the system of FIG. 3, wherein the first combustor includes a first circumferential distribution of injectors.
FIG. 5 is a cross-sectional schematic of an embodiment of a second combustor in the system of FIG. 3, wherein the second combustor includes a second circumferential distribution of injectors that is different than the first circumferential distribution.
FIG. 6 is a cross-sectional schematic of an embodiment of a third combustor in the system of FIG. 3, wherein the third combustor includes a third circumferential distribution of the injectors 18 that is different than the first and second circumferential distribution.

In some embodiments, in addition to axial staggering of injectors 18, the position and/or arrangement of the injectors 18 may be varied within, between, and/or among one or more combustors 12 of the system 10 via circumferential grouping, as further described with respect to FIGS. 4, 5, and 6. For example, the grouping and/or distribution of the LLI injectors 18 along one or more axes in the circumferential direction 54 may be varied between combustors 12, as further described in detail with respect to FIGS. 4-6.

FIG. 4 is a cross-sectional schematic of an embodiment of the first combustor 13 in the system 10 taken along line 4-4 of FIG. 3, wherein the first combustor 13 includes a first circumferential distribution 92 of the injectors 18 along a particular axis in the circumferential direction 54. For example, in the illustrated embodiment, a first set 94 having three injectors 18 and a second set 96 having one injector 18 are circumferentially disposed (e.g., arranged, configured, etc.) approximately along a first circumferential axis 98, as shown in FIG. 3. Each set of injectors 18 may be configured to route the secondary fuel 16 to the secondary combustion zone 30 of the first combustor 13. In particular, varying the configuration and/or arrangement of the injectors 18 within the combustor 12 and/or between combustors 12 (e.g., the first combustor 13 and the second combustor 15) may vary the heat release energy distribution and/or flame shapes, thereby driving different flame dynamic behaviors and shifting the frequency response between the combustors 12. For example, in some embodiments, the injectors 18 of the first combustor 13 may be disposed along the first circumferential axis 98 in a manner that is different than the position and/or arrangement of the injectors 18 of the second combustor 15. More specifically, the first set 94 of injectors 18 may be spatially disposed and/or grouped away from the second set 96 of injectors 18 along the same circumferential axis 98 of the first combustor 13. Indeed, each injector 18 may be spaced at any circumferential distance from another injector 18 of the first combustor 13, such that certain injectors 18 may be spaced closer to each other than other injectors 18. In some embodiments, the circumferential grouping of the injectors 18 in the first combustor 13 may differ from the circumferential grouping of the injectors 18 in an adjacent combustor 12, such as the second combustor 15, as further described in detail with respect to FIG. 5 and FIG. 6.

FIG. 5 is a cross-sectional schematic of an embodiment of the second combustor 15 in the system 10 taken along line 5-5 of FIG. 3, wherein the second combustor 15 includes a second circumferential distribution 100 of the injectors 18 along a particular axis in the circumferential direction 54. For example, in the illustrated embodiment, the second circumferential distribution 100 comprises four injectors 18 configured to route the secondary fuel 16 to the secondary combustion zone 30 of the second combustor 15. In particular, the second circumferential distribution 100 may include one or more injectors 18 (e.g., a first circumferential injector 102, a second circumferential injector 104, a third circumferential injector 106, and a fourth circumferential injector 108) having approximately the same circumferential distance between them. For example, the first, second, third and fourth circumferential injectors 102, 104, 106, 108 may be disposed at 90 degree increments along a circumferential axis 54, such that the first injector 102 and the third injector 106 are oppositely disposed (e.g. separated by approximately 180 degrees in the circumferential direction 54), and the second injector 104 and the fourth injector 108 are also oppositely disposed (separated by approximately 180 degrees in the circumferential direction 54) as shown in FIG. 5. Accordingly, any two circumferential injectors in the illustrated embodiment may be disposed at approximately a first angle 110, such as the first angle 110 at approximately 90 degrees. It should be noted that in other embodiments, the first angle 110 separating any two injectors 18 may be any suitable angle, such as between approximately 1 to 359 degrees, 5 to 10 degrees, 10 to 20 degrees, 20 to 45 degrees, 45 to 90 degrees, 90 to 180 degrees, 180 to 360 degrees, etc. For example, in the illustrated embodiment, the first circumferential injector 102 may be disposed at approximately 45 degrees from the second circumferential injectors 104, rather than at approximately 90 degrees. In addition, the first angle 110 between any two circumferential injectors 102, 104, 106, or 108 may be varied between the combustors 12 for different circumferential configurations and/or arrangements between combustors 12, as further described with respect to FIG. 6.

In this manner, the injectors 18 of the first combustor 13 may be configured and/or arranged differently than the injectors 18 of the second combustor 15. Indeed, as noted above, varying the configuration and/or arrangement of the injectors 18 within the combustor 12 and/or between combustors 12 (e.g., the first combustor 13 and the second combustor 15) may vary the heat release energy distribution and/or flame shapes, thereby driving different flame dynamic behaviors and shifting the frequency response between the combustors 12.

FIG. 6 is a cross-sectional schematic of an embodiment of the third combustor 81 in the system 10 taken along line 6-6 of FIG. 3, wherein the third combustor 81 includes a third circumferential distribution 112 of the injectors 18 along a particular axis in the circumferential direction 54. For example, in the illustrated embodiment, the third circumferential distribution 112 comprises four injectors 18 configured to route the secondary fuel 16 to the secondary combustion zone 30 of the third combustor 81. In particular, the arrangement of the first injector 19, the second injector 21, the third injector 23, and the fourth injector 25 of the third combustor 81 may be different than the arrangement of the first circumferential injector 102, the second circumferential injector 104, the third circumferential injector 106, and the fourth circumferential injector 108 of the second combustor 15. For example, similar to the injectors 18 of the second combustor 15, the injectors 18 of the third combustor 81 may be disposed at 90 degree increments along a circumferential direction 54, such that the first injector 19 and the third injector 23, and the second injector and the fourth injector 25, are approximately 180 degrees apart. However, each of the injectors 18 of the third combustor 81 may be offset by approximately a second angle 113 relative to each of the injectors 18 of the second combustor 15. For example, the first injector 19 of the third combustor 81 may be offset approximately by the second angle 113 (e.g., approximately 45 degrees) relative to the first circumferential injector 102 of the second combustor 15. It should be noted that in other embodiments, the second angle 113 is representative of the angle offset between any two combustors 12 and may be any suitable angle, such as between approximately 1 to 359 degrees, 5 to 10 degrees, 10 to 20 degrees, 20 to 45 degrees, 45 to 90 degrees, 90 to 180 degrees, 180 to 360 degrees, etc.

In this manner, the injectors 18 of the second combustor 15 may be configured and/or arranged differently than the injectors 18 of the third combustor 81. Indeed, as noted above, varying the configuration and/or arrangement of the injectors 18 within the combustor 12 and/or between combustors 12 (e.g., the second combustor 15 and the third combustor 81) may vary the heat release energy distribution and/or flame shapes, thereby driving different flame dynamic behaviors and shifting the frequency response between the combustors 12.

Technical effects of the disclosure include varying the position and/or location of the one or more injectors 18 of the fuel supply circuit 14 associated with each of the one or more combustors 12 of the system 10. Specifically, the position and/or arrangement of the injectors 18 may be varied within, between, and/or among the one or more combustors 12 via axial staggering and/or circumferential grouping to modify the heat release energy distribution and/or the fuel system impedance of the LLI fuel system, and therefore the combustion dynamics of the gas turbine combustor (e.g., varying the frequency, amplitude, combustor-to-combustor coherence, range of frequencies, or any combination thereof). For example, the injectors 18 of a particular combustor 12 may be shifted along the axial direction or axis 50 (e.g., a longitudinal axis) of that combustor 12, such that the position of the injectors 18 may axially vary between the combustors 12 of the system 10. Likewise, the injectors 18 of a particular combustor 12 may be circumferentially grouped and/or distributed along the circumferential direction 54 of that combustor 12, such that the position and/or arrangement of the injectors 18 may circumferentially vary between the combustors 12 of the system 10. It should be noted that in certain embodiments, the injectors 18 of the system 10 may be varied axially and/or circumferentially between the combustors 12.

In certain embodiments, the controller 56 may be may be utilized to regulate the secondary fuel 16 routed to one or more LLI injectors 18 via the LLI fuel circuit 14. For example, in some embodiments, the controller 56 may be configured to bias the secondary fuel 16 routed through the LLI fuel circuit 14 to the LLI injectors 18 of a particular combustor 12. In this manner, the controller 56 may be configured to change the operation of the LLI injectors 18 to reduce combustion dynamics without necessarily varying the arrangement and/or configuration of the injectors 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a gas turbine engine, the gas turbine engine comprising:
a first combustor and a second combustor, each combustor having a head end and a liner extending downstream from the head end, the liner defining a primary combustion zone and a secondary combustion zone downstream of the primary combustion zone;
a first plurality of fuel injectors arranged in a first configuration for supplying a first oxidant/fuel mixture through the liner of the first combustor to the secondary combustion zone of the first combustor, the first plurality of fuel injectors being arranged in one or more axial planes including a first axial plane in the first combustor, wherein at least one fuel injector of the first plurality of fuel injectors is arranged in the first axial Diane;
a second plurality of fuel injectors arranged in a second configuration for supplying a second oxidant/fuel mixture through the liner of the second combustor to the secondary combustion zone of the second combustor, the second plurality of fuel injectors being arranged in one or more axial planes including a second axial plane in the second combustor, wherein at least one fuel injector of the second plurality of fuel injectors is arranged in the second axial plane;
wherein the first configuration and the second configuration are different from one another in at least one of: a number of fuel injectors in the first plurality of fuel injectors relative to a number of fuel injectors in the second plurality of fuel injectors; a location of the first axial plane relative to a location of the second axial plane; and a first circumferential spacing of the first plurality of fuel injectors relative to a second circumferential spacing of the second plurality of fuel injectors; and
wherein, during operation of the gas turbine engine, the at least one difference between the first configuration and the second configuration results in the first combustor operating with a first combustion dynamics frequency and the second combustor operating with a second combustion dynamics frequency, wherein the first combustion dynamics frequency is different than the second combustion dynamics frequency.

2. The system of claim 1, wherein the number of fuel injectors in the first plurality of fuel injectors in the first configuration is greater than the number of fuel injectors in the second plurality of fuel injectors in the second configuration.

3. The system of claim 1, wherein the first axial plane is located at a first distance from the head end of the first combustor;
wherein the second axial plane is located at a second distance from the head end of the second combustor; and
wherein the first distance and the second distance are different.

4. The system of claim 3, wherein the first plurality of fuel injectors is arranged in at least two axial planes, the at least two axial planes including the first axial plane and a first downstream axial plane in the first combustor, the first downstream axial plane and the head end of the first combustor defining therebetween a third distance;
wherein the second plurality of fuel injectors is arranged in at least two axial planes, the at least two axial planes including the second axial plane and a second downstream axial plane in the second combustor, the second downstream axial plane and the head end of the second combustor defining therebetween a fourth distance; and wherein the third distance and the fourth distance are different.

5. The system of claim 1, wherein the first plurality of fuel injectors is arranged circumferentially about the liner in the first circumferential spacing; and wherein the second plurality of fuel injectors are arranged circumferentially about the liner in the second circumferential spacing different from the first circumferential spacing.

6. The system of claim 1, wherein the first plurality of fuel injectors is arranged circumferentially about the liner in the first circumferential spacing; wherein the second plurality of fuel injectors are arranged circumferentially about the liner in the second circumferential spacing; and wherein the first circumferential spacing and the second circumferential spacing are the same, the first plurality of fuel injectors being circumferentially offset from the second plurality of fuel injectors relative to respective longitudinal axes of the first combustor and the second combustor.

7. The system of claim 1, wherein the first plurality of fuel injectors in the first configuration are arranged with the first circumferential spacing and the first axial plane is located at a first distance from the head end of the first combustor; and
wherein the second plurality of fuel injectors in the second configuration are arranged with the second circumferential spacing and the second axial plane s located at a second distance from the head end of the second combustor; and
wherein the first circumferential spacing is different from the second circumferential spacing, and the first distance is different from the second distance.

8. The system of claim 1, further comprising a controller configured to control a rate at which fuel is supplied to a first fuel injector of the first plurality of fuel injectors and a rate at which fuel is supplied to a second fuel injector of the first plurality of fuel injectors, such that the first fuel injector and the second fuel injector of the first plurality of fuel injectors receive fuel at different non-zero flow rates.

9. The system of claim 1, further comprising a controller configured to control rate at which fuel is supplied to a first fuel injector of the first plurality of fuel injectors and a rate at which fuel is supplied to a second fuel injector of the second plurality of fuel injectors, such that the first fuel injector and the second fuel injector receive fuel at different non-zero flow rates.

10. The system of claim 9, wherein a difference between the non-zero flow rate of the first fuel injector in the first combustor as compared to the non-zero flow rate of the second fuel injector in the second combustor results in different flame dynamics between the first fuel injector and the second fuel injector.

11. The system of claim 9, wherein a difference between the non-zero flow rate of the first fuel injector in the first combustor as compared to the non-zero flow rate of the second fuel injector in the second combustor results in a first ratio of the oxidant/fuel mixture in the first fuel injector and a second ratio of the oxidant/fuel mixture in the second fuel injector different from the first ratio, thereby varying flame dynamics.

* * * * *